March 31, 1959     D. E. CORNELL III     2,879,940
GEAR CHANGE INDICATOR
Filed March 22, 1956
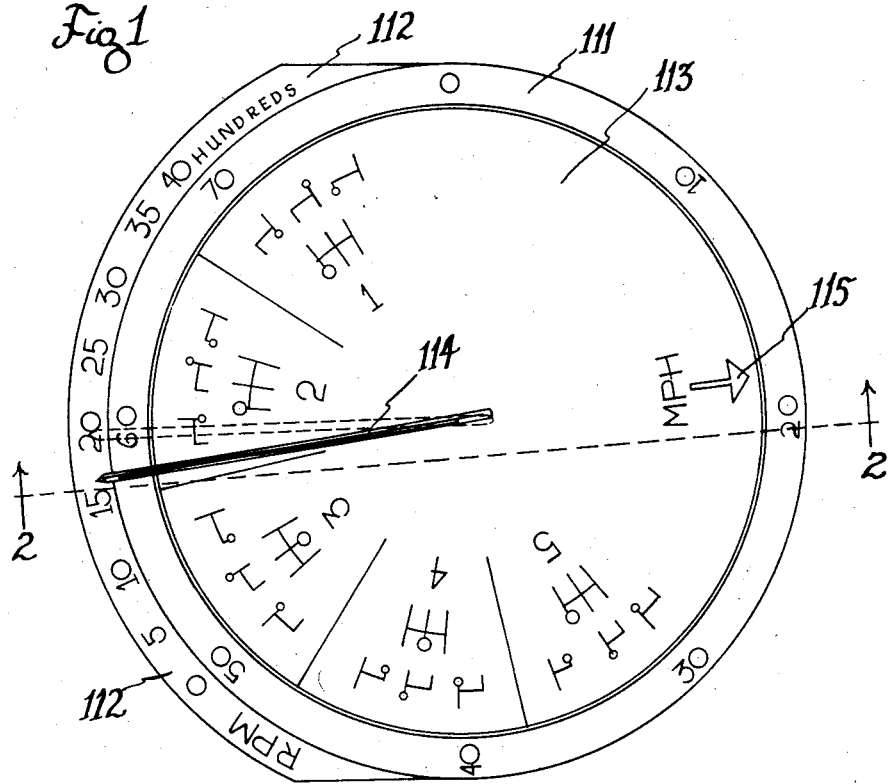
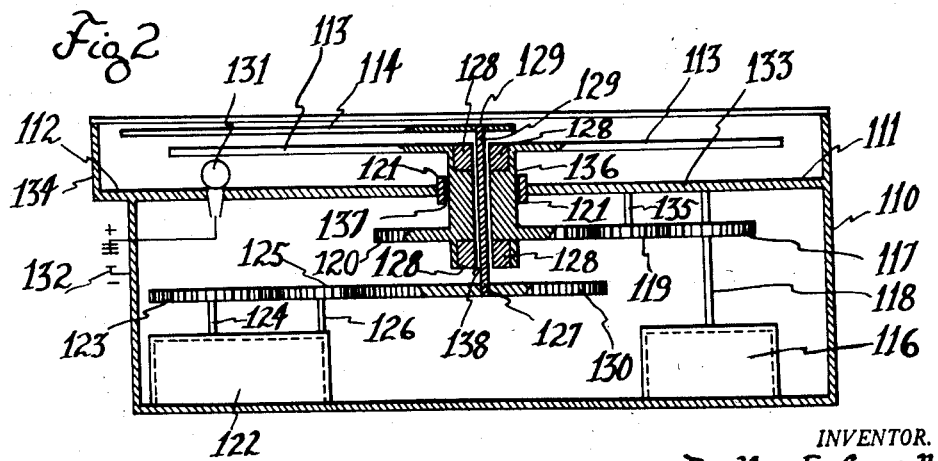
INVENTOR.
Dudley E. Cornell III
BY John F. Bregina United States Patent Office
2,879,940
Patented Mar. 31, 1959

2,879,940

GEAR CHANGE INDICATOR

Dudley E. Cornell III, Mojave, Calif.

Application March 22, 1956, Serial No. 573,296

3 Claims. (Cl. 235—103.5)

This invention relates to a device for use in motor vehicles and the like adapted for indicating the time at which an operator should shift gears. More particularly, this invention relates to an indicator device adapted to permit the operator of a motor vehicle or the like to synchronize motor speed with vehicle speed when shifting the motor power transmission.

A tachometer is ordinarily employed for the purpose of advising the operator of a motor vehicle, such as a truck or the like, of the speed of the motor by registering and indicating the revolutions per minute of the motor. The speedometer is conventionally used in motor vehicles to indicate the speed of the vehicle.

Without this device a truck driver upon realizing the necessity for a change in gear position disengages the clutch, accelerates the motor to an "r.p.m." which the driver determines by trial and error experience, shifts the gears and engages the clutch. Ninety percent of the mechanical skill of driving a truck is determining the proper relationship between "r.p.m." and vehicle speed for each gear position. It is my contention that by using this device a novice can establish this ratio more accurately and consistently than an experienced driver without it.

In heavy devices, for example, such as large trucks which have a plurality of transmission combinations, there is a need for an indicator adapted to permit synchronizing the vehicle and motor speeds so that, with certainty, an operator can shift transmission gears to the proper position without grinding gears.

It is an object of this invention to provide an indicating device whereby an operator of a motor vehicle or the like can have simultaneous visual notice of the motor and vehicle speeds to enable him to know when the power transmission gears of the operated vehicle may be shifted to a given or desired position.

It is an additional object of this invention to provide a device for a motor vehicle and the like employing a speedometer, a tachometer and a synchronizing mechanism whereby motor speed may be achieved for a given vehicle speed by reference to a visible indicator instrument to permit shifting of the power transmission gears into optional position.

It is a yet further object of this invention to provide a combination tachometer and speedometer, the indicator components of which are movable relative to each other to indicate in a single easily read instrument the position of the power transmission gears of the motor of a motor vehicle and the like, the vehicle speed and the motor speed.

Accordingly, the instant invention provides an indicator device which in the embodiment illustrated is for a motor vehicle having a 5-speed main transmission with a 3-speed auxiliary transmission and advises the operator when to shift gears. However, I desire that it be understood that a proper indicia-bearing member for any motor vehicle may be suitably prepared.

Other and further objects of the invention will become apparent from the following description and appended claims, reference being had to the accompanying drawings and numerals of reference thereon.

On the drawings:

Fig. 1 is a front elevational view of the face of the viewable indicator.

Fig. 2 is a longitudinal sectional view through the casing housing the indicator mechanism of an embodiment of the invention, parts being broken away for the purpose of illustration, the electrical system being shown schematically.

Having particular reference to the drawings, an open faced casing 110 is suitably secured behind the dashboard (not shown) of a motor vehicle such as a truck or the like in a preferable position which is selected for the purpose of bringing the face of indicator ring 111 substantially into the direct line of sight of the operator of the motor vehicle, without turning his head to one side. The ring 111 bears indicia corresponding to the speed in miles per hour of the vehicle; and said ring 111 is that annular portion of the centrally apertured casing cover 133 extending beyond disk 113. In Fig. 1 only selected speeds of the vehicle are shown, being indicated by the numerals 10, 20, 30, 40, 50, 60, 70 and 0.

Casing 110 has an open faced, integral arcuately extending section 134 the back section 112 of which is an upper integral extension of ring 111. The section 112 bears the indicia "r.p.m." which means revolutions per minute and refers to speed of the motor, and the word "hundreds" at opposite ends of the arcuately extending section 112. Between them are the numerals 0, 5, 10, 15, 20, 25, 30, 35 and 40, which correspond to the number of hundreds of revolutions per minute of the motor.

The plate or disk 113 is rotatably mounted within casing 110 in front of casing cover 133 in a position suitable for easy viewing by the operator of the device. An indicator needle or pointer 114, is rotatably mounted in front of ring 111 and disk 113, as illustrated in Figs. 1 and 2. Said needle 114 is of a sufficient length to extend in front of the arcuate section 112 and is adapted to indicate the number of revolutions per minute in hundreds of the motor of the device by pointing to same, as illustrated in Fig. 1, as the motor of the vehicle is operated.

Disk 113, in the embodiment shown, bears the representation of an arrow 115 adjacent to which it bears the indicia "m.p.h." which means miles per hour and refers to the speed of the vehicle. Because the disk 113 is rotatable the arrow 115 will designate a position on ring 111 from which the viewer or operator will be able to ascertain the speed of the vehicle. The face of the disk 113 also carries a plurality of indicia or symbols which are divided into consecutive zones designated by the numerals 1, 2, 3, 4 and 5. The symbols in each of said zones identify a different position of the five speed main transmission and three speeds of the auxiliary transmission for each position of the main transmission. Accordingly, until the needle 114 is positioned over a proper zone, the vehicle operator will not shift gears for a given vehicle speed as the vehicle and motor speeds are not synchronized. Within any given zone, the preferred position of the auxiliary transmission symbol should be aligned with needle 114 before the vehicle operator shifts the auxiliary transmission to the proper position. In Fig. 1, the arrow 115 shows a vehicle traveling about 18 miles per hour with the motor speed being about 1700 revolutions per minute, in accordance with the solid line position of needle 114.

A speedometer mechanism 116 is suitably secured within casing 112. Said speedometer mechanism causes rotation of gear 117 which is carried on a shaft 118. The shaft 118 is operably connected at one of its ends to said speedometer mechanism and at the other end thereof is journalled in said cover 133. The speedometer mechanism is not herein illustrated in detail as any conventional construction may be employed and inasmuch as the details of construction of the speedometer mechanism do not provide critical limitations as regards the invention. The gear 117 will rotate on its axis in one direction or the other depending on the change in the speed of the vehicle or will be held in fixed position as long as the speed of the vehicle remains constant. Gear 117 meshes with and drives gear 119 which is carried on one end of a shaft 135 which at the other end thereof is journalled in said cover 133. The end of the speedometer mechanism operated gear train is formed by a gear-like flange 120 which meshes with and is driven by gear 119 and which in the preferred embodiment of the invention is constructed integral with a torque tube 136 so that the rotational position of the torque tube will be dependent upon the rotational position of the gear 119. The disk 113 is preferably fabricated integral with and carried on the other end of a centrally passaged torque tube 136 and the designation of the speed of the vehicle as indicated by arrow 115 will depend wholly upon the relative position of torque tube 136. The torque tube 136 is journalled in an annular thrust bearing 121 which is suitably carried within casing 110 or cover 133 about the central aperture 137, as illustrated in Fig. 2. The torque tube 136 is centrally positioned with respect to the disk 113 which it carries.

A conventional tachometer mechanism 122, the details of construction of which are not illustrated, is carried within its casing which is suitably secured within housing 110. The tachometer mechanism is actuated by the speed of the vehicle motor. Gear 123, which is operably connected to the tachometer mechanism will be rotated in one direction or the other or maintained in fixed position depending upon whether the motor is accelerating or decelerating, or is operating at a given speed. Gear 123 is rigidly secured on the outer end of a pin or shaft 124 which at its inner end is operably connected to the tachometer mechanism. Gear 123 meshes with and determines the position of a gear 125 which is carried on the end of a shaft or pin 126 that is shown journalled in the housing of tachometer mechanism 122. An elongated pin or shaft 127 extends longitudinally through central passage 138 in torque tube 136 and is journalled in a pair of annular thrust bearings 128 suitably secured within the torque tube 136 at opposite ends thereof. At its outer end 129 the pin 128 is rigidly secured to the indicator needle 114, thereby providing a common axis of rotation for the torque tube 136, the needle 114 and disk 113. A gear 130 is secured on the inner end of pin 127. The gear 130 meshes with gear 125 and thereby operably actuates needle 114.

A light fixture carrying an illuminating light 131 is suitably supported within the casing 110 by any appropriate means. Herein it is shown as being borne in the cover 133. It is energized by the electrical system 132 of the vehicle, schematically represented in Fig. 2. The light rays of light 131 directly illuminate section 112 and ring 111 so that the speed of the vehicle and the speed of its motor or engine may be viewed by direct light. The face of the disk 113 and the transmission gear position symbols are exposed to indirect rays from light 131 or may be illuminated from behind by making disk 113 of translucent construction.

Now, then, it is apparent that the mechanism operating needle indicator 114 is independent of the mechanism operating rotatable disk 113. In other words, the speedometer mechanism is independent of the tachometer mechanism yet the respective representations which each represents is so-related on a common instrument by which an operator is made cognizant of the proper speed to which to bring the motor of the operated vehicle before shifting to the desired gear.

The application of this invention is especially important for inexperienced operators and for experienced operators managing a vehicle under unusual driving conditions, for example, a truck running away down hill.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. A device to aid in synchronizing the vehicle speed with the speed of the motor of a motor vehicle and the like prior to shifting the motor power transmission gears comprising a speedometer mechanism having a rotatable tube; a disk bearing indicia representing various gear positions of the vehicle operably connected to and rotatably driven by said tube; a tachometer mechanism having a driven pointer mounted on a pin, said pin being journalled in said tube and being movable independently of said tube, said pointer designating each desired gear position.

2. A device of the class described comprising a tachometer mechanism; a speedometer mechanism; a rotatable disc operably connected to and rotatably driven by said speedometer mechanism; a pointer operably connected to and rotatably driven by said tachometer, said disc having thereon designations of various gear transmission arrangements, said designations rotating with said disc independently of said pointer, said pointer indicating from said designations desired arrangement of the transmission gears.

3. A device of the class described substantially as defined in claim 2 and further characterized by a pair of arcuately extending fixed scales, one thereof bearing vehicular speed indicia and the other thereof bearing motor speed indicia, and being aligned with said pointer whereby motor speed is ascertainable, and a second pointer carried on said disc, said second pointer being aligned with said vehicular speed indicia whereby vehicle speed is ascertainable.

References Cited in the file of this patent

UNITED STATES PATENTS

| 1,393,569 | Richardson | Oct. 11, 1921 |
| 1,486,619 | Tolson | Mar. 11, 1924 |
| 1,868,816 | Dempster | July 26, 1932 |
| 2,702,520 | Helgeby | Feb. 22, 1955 |

FOREIGN PATENTS

| 832,154 | France | June 27, 1938 |